United States Patent [19]
Cranfill et al.

[11] Patent Number: 5,756,882
[45] Date of Patent: May 26, 1998

[54] CAP LOW LEAK TESTING SYSTEM

[75] Inventors: Leonard J. Cranfill; Jeff M. Bunyard, both of Connersville, Ind.

[73] Assignee: Stant Manufacturing Inc., Connersville, Ind.

[21] Appl. No.: 576,507

[22] Filed: Dec. 21, 1995

[51] Int. Cl.⁶ .............. G01M 3/08; G01M 3/28; B65D 6/12
[52] U.S. Cl. .............. 73/46; 73/40.5; 141/2; 141/94; 141/96; 137/177; 137/312; 137/551
[58] Field of Search .............. 73/46, 40.5; 141/2, 141/4, 94, 95, 96; 137/313, 177, 312, 551

[56] References Cited

U.S. PATENT DOCUMENTS

| | | | |
|---|---|---|---|
| 3,400,580 | 9/1968 | Haren et al. | 73/119 |
| 4,000,632 | 1/1977 | Summan | 70/165 |
| 4,162,021 | 7/1979 | Crute | 220/202 |
| 4,795,050 | 1/1989 | Smith et al. | 220/85 VR |
| 4,888,979 | 12/1989 | Steeper | 73/40.7 |
| 4,913,303 | 4/1990 | Harris | 220/204 |
| 5,170,659 | 12/1992 | Kemp | 73/46 |
| 5,182,076 | 1/1993 | de Seroux et al. | 376/250 |
| 5,195,361 | 3/1993 | Wood et al. | 73/49.8 |
| 5,265,464 | 11/1993 | Caron et al. | 73/46 |
| 5,307,669 | 5/1994 | Nishio | 73/46 |
| 5,323,640 | 6/1994 | Porcaro et al. | 73/40 |
| 5,383,351 | 1/1995 | Kotlyar | 73/40 |
| 5,445,196 | 8/1995 | Tyree, Jr. | 141/297 |

*Primary Examiner*—Hezron E. Williams
*Assistant Examiner*—J. David Wiggins
*Attorney, Agent, or Firm*—Barnes & Thornburg

[57] ABSTRACT

A method is provided for accurately determining the volume of gas that has leaked through and around a cap having a mouth and a seal situated about the circumference of the mouth. The method includes the steps of positioning the cap within a testing neck on a fuel cap testing apparatus, fixing the cap in the neck to create a general sealing engagement between the seal and the neck and to cause the seal to move into the neck, and "staging" the cap for at least 2.5 seconds. Staging refers to the necessary waiting period that must pass in order to allow the seal to complete moving into the testing neck. A test is then conducted for changes in pressure within the testing neck due to low-volume gas leaks through and around the cap.

35 Claims, 4 Drawing Sheets

CAP LOW LEAK TESTING SYSTEM

BACKGROUND AND SUMMARY OF THE INVENTION

This invention relates to a method for detecting fluid leaks passing by or through a cap, and particularly to a method for detecting low-volume gas leaks passing by or through a fuel cap. Most particularly, the present invention relates to a method for testing for gas leaks of approximately 0.2 cc/min passing by or through a fuel cap formed for engagement with a filler neck.

It is well known to use fuel caps having an o-ring positioned about a mouth of the cap to seal against a filler neck of a vehicle. See, for example, U.S. Pat. No. 4,000,632 to Summan. These o-rings are often designed to move down around the radius of the filler neck, that is undergo o-ring creep, after initial sealing engagement between the fuel cap and the filler neck. This movement is desirable so that neither fuel vapor nor liquid fuel flow through and/or around the fuel cap and out of the fuel tank upon rollover or high pressure conditions. In this specification and in the claims the phrase "o-ring creep" is intended to cover movement of any seal situated about the mouth of the cap into the filler neck after this initial sealing engagement.

Prior to installing a fuel cap onto the filler neck of a motor vehicle, it is necessary to assess the efficacy of the cap to prevent fuel vapor leaks through the mouth of the filler neck closed by the cap. Fuel caps have been hereinbefore been tested for gas leaks on automatic machinery 100 such as that illustrated in FIG. 1a. The machinery 100 includes a testing neck 110 and a pressure transducer 112 to test for gas leaks through a fuel cap 114. Cap 114 rotates as indicated by arrow 115 on a platform 116 to various testing stations (not shown). Gas leak tests conduced on machinery 100 have "fast cycle" times under 4 seconds, have an input gas pressure of 11.0 kPA, and have a maximum allowable gas leak rate of 10 cc/min. Such fast testing cycles are said to include the steps of fixing the cap 114 in the testing neck 110, immediately thereafter, filling the testing neck 110 with a gas at 11.0 kPa, and then measuring a pressure differential within the testing neck 110 with transducer 116.

Government regulations have recently been changed to lower substantially, the total vehicle leak rate resulting in maximum allowable gas leak rate passing by or through the fuel cap to 0.2 cc/min. Fuel caps tested for low-volume gas leaks using the above-described fast cycle testing method in machinery 100 regularly fail regardless of their actual sealing capabilities. Such false test results have led to increased production expense due to the worker time necessary to retest, reassemble, or discard perfectly good caps. A method which allows for more accurate testing for low-volume gas leaks through and around a fuel cap, which in turn decreases the frequency of false test results would be a welcome improvement over conventional fast cycle test methods.

o-ring creep has an adverse effect upon conventional testing methods using a fast cycle time. It is believed that the o-ring displaces gas as it moves in the passageway of the testing neck and thus changes the enclosed volume and regulating pressure within the testing neck. So, when caps are tested for low-volume gas leaks at a fast cycle time, the o-ring creep, which has changed the gas pressure within the neck, causes bad caps to appear to be non-leaking. Therefore, in order to have a consistently valid low-volume gas leak test it is necessary to eliminate the effect that o-ring creep has upon pressure measurements within the testing neck. We have found that providing a sufficient waiting period that allows the o-ring creep to settle out after the cap is fixed within the testing neck, produces a valid low-volume gas leak test. This waiting period is hereinafter referred to as "staging". It was found during the development of the invention disclosed herein that it is necessary to stage the cap for at least 2.5 seconds prior to conducting the low-volume gas leak test in order to ensure that the o-ring seal has completed, its gas displacing movement in the testing neck.

According to the present invention, a test method is provided for identifying caps unable to meet certain low-volume gas leak standards. The caps are tested in an apparatus having a testing neck that includes a rim defining a passageway therein, a testing head for channeling gas into the testing neck at a pre-determined fixed pressure, and a pressure transducer for measuring the difference in pressure within the testing neck due to gas leaks through and around the fuel cap. Generally, the cap to be tested is a fuel cap that includes a housing having a mouth and a seal positioned about the circumference of the mouth.

The method of the present invention includes the steps of placing the housing of the fuel cap into the passageway of the neck and fixing the housing within the passageway so that the rim of the neck compresses the seal to create an initial sealing engagement between the cap and neck. The cap is then staged for a predetermined length of time until the seal completes its axially inward, gas-displacing movement in the passageway of the testing neck. The pressure transducer measures the pressure differential within the testing neck so that the amount, if any, of gas that has leaked from the testing neck through the mouth of the neck receiving the fuel cap may be calculated.

In preferred embodiments of the present invention, the fuel cap includes threads extending about the housing and the fixing step includes the step of torquing the cap about a central axis of the housing into the testing neck so that the threads securely fix the cap within the passageway. In such an embodiment, additional clamping equipment for holding the cap in its sealing engagement with the testing neck is not required.

The method of the present invention is thus provided to allow fuel caps to be tested for low-volume gas leaks accurately. Since the effects of o-ring creep have been minimized, caps are less likely to be incorrectly accepted. Therefore, numerous satisfactory caps will be installed onto filler necks and unsatisfactory caps may be repaired or discarded. This method allows manufacturers of fuel caps to make caps more economically.

Additional objects, features, and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1B:
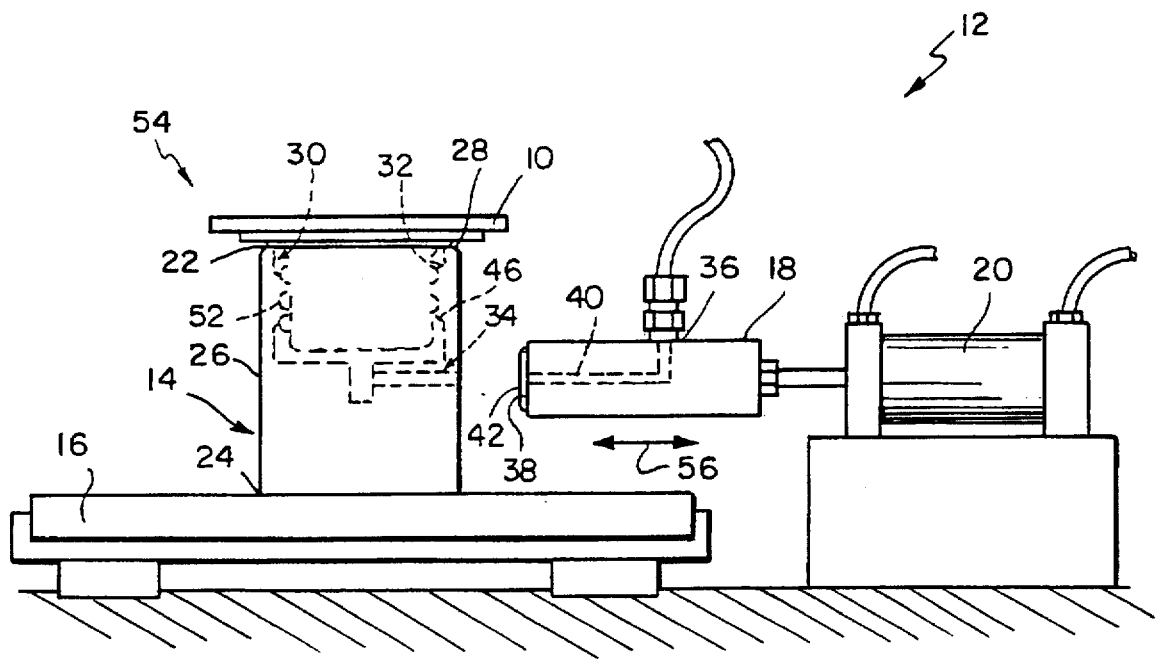
FIG. 1b is a perspective view of a multiple station conveyor assembly in accordance with the present invention showing a stationary testing head, a movable conveyor platform supporting a testing neck thereon, and a fuel cap positioned within the testing neck.

A method for testing for low-volume gas leaks through and/or around a cap 10 is provided in accordance with the present invention. The method minimizes adverse effects that "o-ring creep" has upon low-volume gas leak testing. Thus, an accurate testing method is provided for use with a variety of testing equipment. In one embodiment, the method is carried out using a multiple station conveyor testing assembly 12 as shown in FIG. 1b. The multiple station assembly 12 includes a testing neck 14 situated on a movable conveyor platform 16 and a stationary testing head 18 coupled to a pressure transducer 20. The cap 10 is fixed within the testing neck 14, "staged" for a pre-determined period of time, and a pressure differential within the testing neck 14 is measured by the pressure transducer 20. Staging refers to the necessary time period that must pass in order to that allow the o-ring to complete gas displacing movement in the testing neck 14.

The testing neck 14 illustratively includes an upper end 22, a lower end 24, and a cylindrical wall 26 extending between the opposite ends 22, 24. A rim 28 is situated at the upper end 22 and defines a cap-receiving passageway 30 within the neck 14. Preferably, threads 32 are positioned in the cap-receiving passageway 30 along the cylindrical wall 26. Further, an gas-inlet passageway 34 communicates with the cap-receiving passageway 30 and extends through the cylindrical wall 26. The gas-inlet passageway 34 may extend through the testing neck 14 at a variety of locations so long as it communicates with the cap-receiving passageway 30.

Figure 2:
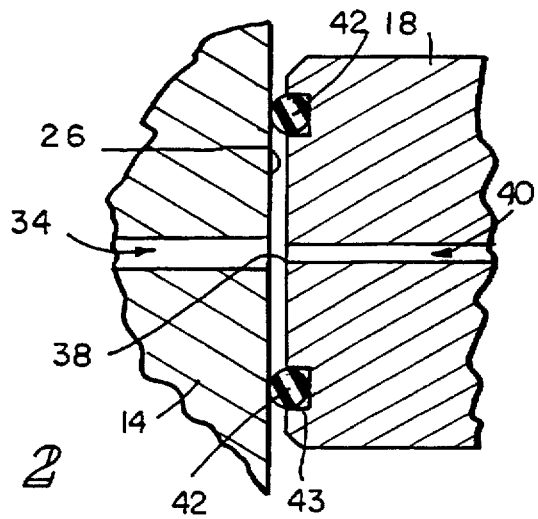
FIG. 2 is an enlarged cross-sectional view of the testing neck and testing head of FIG. 1b after the conveyor platform has moved the testing neck into a sealing engagement with the testing head.
Figure 1A:
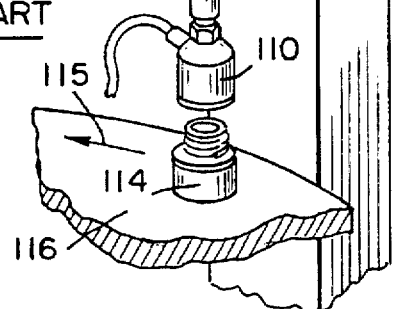
FIG. 1a is a perspective view of a prior art gas leak testing assembly.
Figure 3:
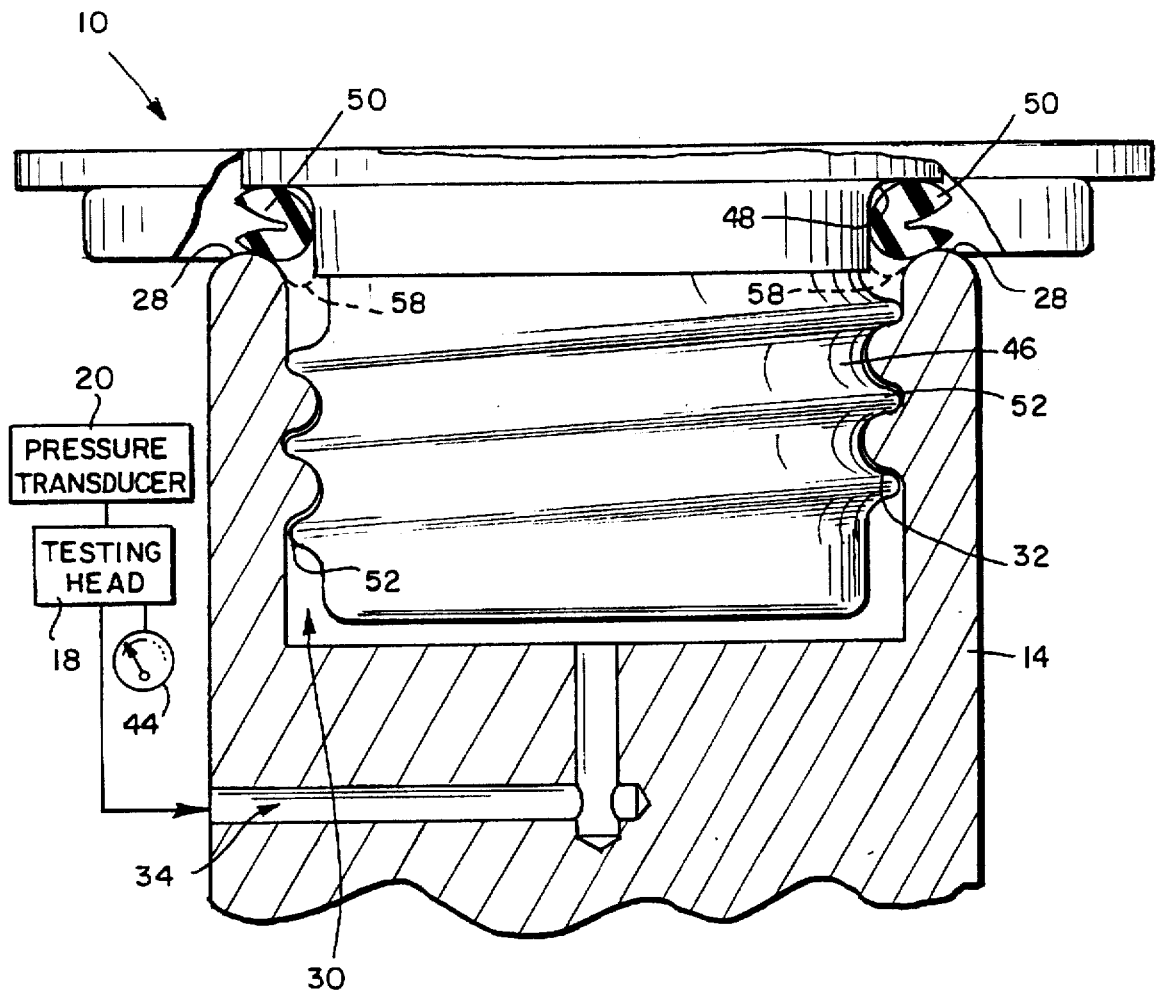
FIG. 3 is a partial cross-sectional view of the testing neck similar to that of FIG. 1b showing the testing neck having a rim which defines a passageway therein and the cap having an o-ring compressed against the rim just after the fuel cap has been fixed within the passageway of the testing neck.

The testing head 18 of the multiple station assembly 12 includes a nozzle inlet 36 extending therein, an gas outlet 38 extending therefrom, and a regulated gas-flow passageway 40 extending through the testing head 18 between the nozzle inlet 36 and the gas outlet 38. As best shown in FIG. 2, the testing head 18 includes a seal 42 mounted in an annular channel 43 formed in testing head 18 and arranged to encircle gas outlet 38. Moreover, the testing head 18 is constructed so as to include a pressure gauge 44 as shown in FIG. 3. The pressure gauge 44 ensures that testing personnel may readily confirm that the pressure of the gas-flow within the regulated gas-flow passageway 40 remains at the pre-determined pressure.

Figure 4:
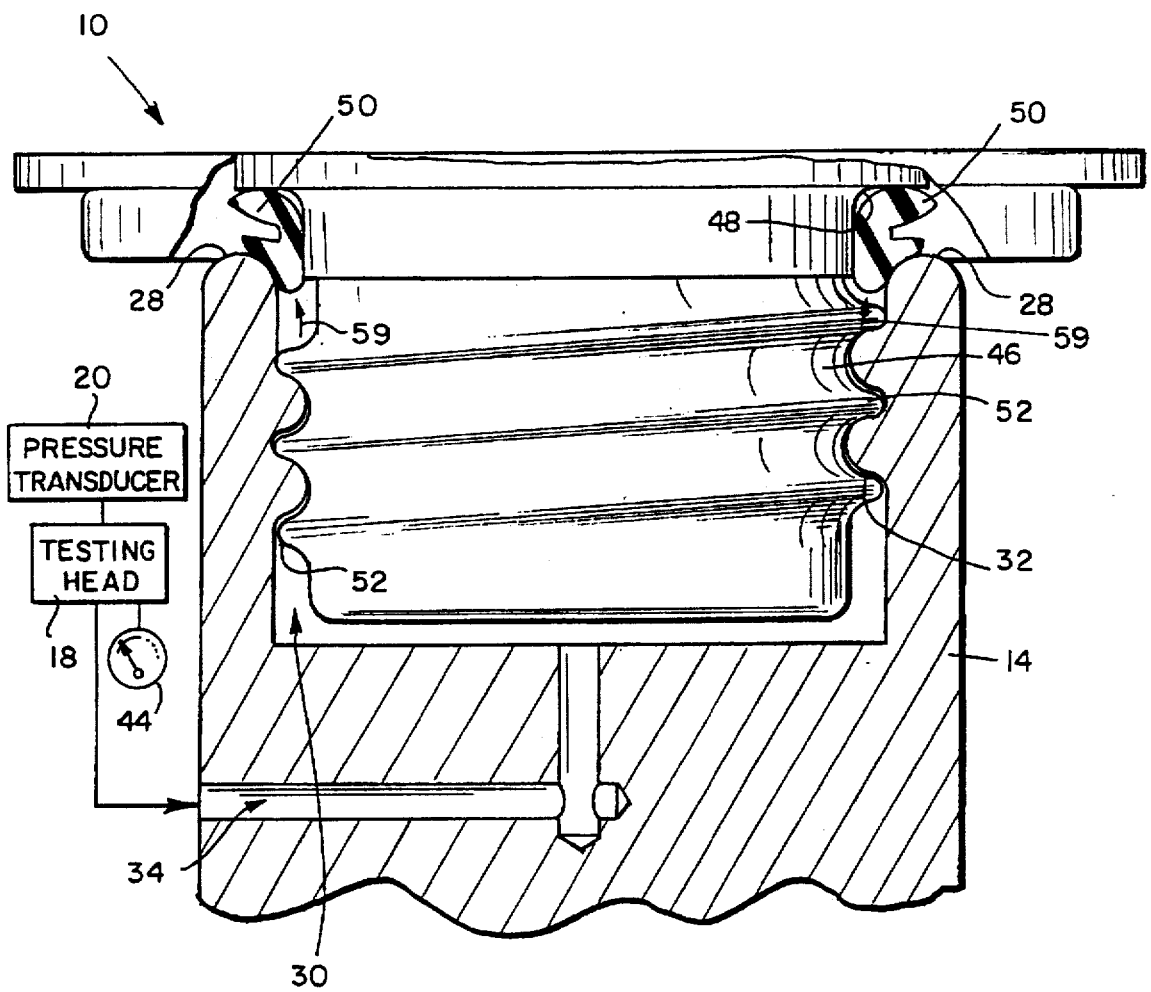
FIG. 4 is a view similar to FIG. 3 showing the testing neck after the o-ring of the fuel cap has been "staged" and thus has completed moving past the rim and into the passageway of the testing neck.

Referring now to FIG. 3, caps 10 suitable for use with the present invention include a housing 46 having a mouth 48 and a seal 50 positioned about the circumference of the mouth 48. The seal 50 may be formed as an o-ring, a split o-ring, or any number of seals conventionally used in caps 10 formed to seal containers (not shown) holding gaseous or volatile liquid materials therein. The cap 10 should be formed to create a secure engagement between the rim 28 of the testing neck 14 and the seal 50. The cap 10 may contain within the housing 46 a wide variety of known pressure-relief and vacuum-relief valves (not shown). See, for example, U.S. Pat. No. 4,162,021 to Crute. The method of the present invention permits accurate testing of low-volume gas leaks through such valves (not shown) in said caps 10. Preferably, as best shown in FIGS. 3 and 4, cap 10 includes threads 52 which correspond with threads 32 in the testing neck 14 so that the cap 10 may be securely torqued within the cap-receiving passageway 30.

Referring again to FIG. 1b, the multiple-station conveyor testing assembly 12 operates by having the cap 10 pre-positioned within the cap-receiving passageway 30 of the testing neck 14 at the same general specifications as installation onto a conventional filler neck (not shown). Thus, the cap 10 and neck 14 form a staging subassembly 54. The conveyor platform 16 selectively moves this staging subassembly 54 as indicated by arrow 56 into and out of engagement with the stationary testing head 18. One conveyor platform 16 suitable for use with the present invention is commercially available from Prodel, Inc., a French corporation. Preferably, the subassembly 54 engages the testing head 18 after the cap 10 has been staged for pre-determined amount of time to allow for continuous process flow.

As best shown in FIG. 2, the seal 42 of the testing head 18 presses against the cylindrical wall 26 of the testing neck 14 to create a secure seal therebetween. This sealing engagement effectively prevents the escape of gas from the gas-inlet passageway 34 during testing for low-volume gas leaks through and around the cap 10. After testing, the subassembly 54 is unsecured from the testing neck 14, rejected caps (not shown) are offloaded, accepted caps (not shown) are finally assembled and then offloaded into shipping boxes (not shown).

In practice of the method of the present invention, the cap 10 is placed within the cap-receiving passageway 30 of the testing neck 14. The cap 10 is then torqued, preferably at a pressure of about 1.2 Newton-Meters, until the seal 50 is initially compressed, as shown in FIG. 3, and a secure sealing engagement is established between the seal 50 and the rim 28 of the testing neck 14. The conveyor platform 16 then moves the staging subassembly 54 toward the stationary testing head 18. The conveyor platform 16 is moved at a rate sufficient to allow the o-ring seal 50 to stage, that is to move into the cap-receiving passageway 30 of the testing neck 14 toward the final staged position as illustrated by dotted lines 58.

During this staging step, the seal 50 is displacing gas within the passageway 30 of the testing neck 14. Typically, a split o-ring seal 50 such as that illustrated in FIGS. 3–4, creeps approximately 0.065 inches or 0.17 cm into the cap-receiving passageway 30 during this staging step. In accordance with the present invention, staging requires that at least 2.5 seconds pass in order to allow complete movement, or creep of the seal 50 into the cap-receiving passageway 30. Preferably, seal 50 as shown in FIGS. 3–4, is staged for about 6 seconds. Staging will vary depending upon the type of seal 50 used about the mouth 48 of the cap 10 but will always be longer than 2.5 seconds. Further, staging will also vary depending upon the material from which the seal 50 is constructed.

After the staging step is complete and thus a sufficient amount of time has passed, the seal 50 is situated in a final staged position as shown in FIG. 4. At this time, the gas-inlet passageway 34 introduces a gas into the cap-receiving passageway 30 as illustrated by arrow 59. Typically, the gas selected is air, however it is understood that a wide variety of gases may be introduced into the testing neck 14 for purposes of the method of the present invention. The gas is fed into the testing neck 14 at a substantially fixed pressure of about 5 kPa, however it is contemplated that gas pressure may be varied. The pressure within the cap-receiving passageway 30 can be measured using the pressure gauge 44.

Next, a pre-determined period of time is allowed to pass in order to give the gas present within the passageway 30 time to escape through and/or past the cap 10. This period of time is generally between about 2.5 and about 8 seconds. Once this time period has passed, the pressure transducer 20 reads the gas pressure within the testing neck 14 and the pressure differential is then calculated. The method of the present invention has a cycle time of about nineteen (19) seconds per cap 10. However, this cycle time will vary depending upon the testing apparatus utilized. Thus, a method is provided by the present invention which accurately measures low-level gas leaks through and/or around a cap 10 by eliminating the adverse effects of o-ring creep.

Figure 5:
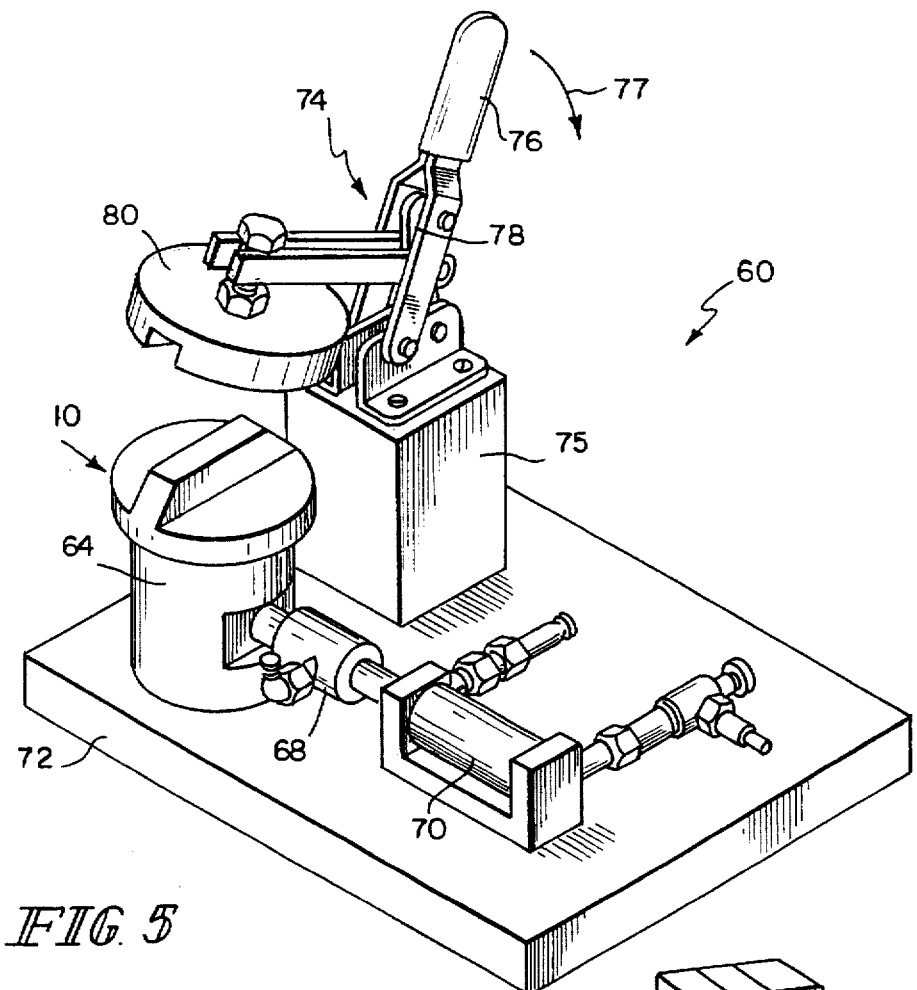
FIG. 5 is a perspective view of another embodiment of the present invention showing a single station hand-activated clamping assembly having a stationary testing head fixed to a stationary testing neck and a fuel cap situated within the testing neck.

The method of the present invention may also be conducted in conjunction with a clamping assembly 60 as illustrated in FIG. 5. The clamping assembly 60 includes a stationary testing neck 64 formed similarly to the testing neck 14 illustrated in FIG. 1b, a stationary testing head 68 affixed to the testing neck 64, and a pressure transducer 70. Illustratively, the neck 64, head 68, and transducer 70 are mounted on a testing block 72. Clamping assembly 60 further includes a clamping apparatus 74 securely fastened on a mounting block 75. Clamping apparatus 74 includes a handle 76, a lever 78, and a brace 80.

In operation of the present method, a user positions cap 10 within the testing neck 64 in the manner previously described. The user pulls the handle 76 in direction 77 to activate lever 78 and move the brace 80 into the cap 10 to clamp the cap 10 securely within the neck 64. The cap 10 is then staged until the seal (not shown) moves from its initial clamping position (see, for example, FIG. 3) to its final staged position (see, for example, FIG. 4) before the testing head 68 introduces gas into the testing neck 64 at a generally fixed pressure of 5 kPa. After the neck 64 has been filled with the gas, the pressure transducer 70 measures the gas pressure within the neck 64 as previously described in order that the pressure differential may be calculated.

Figure 6:
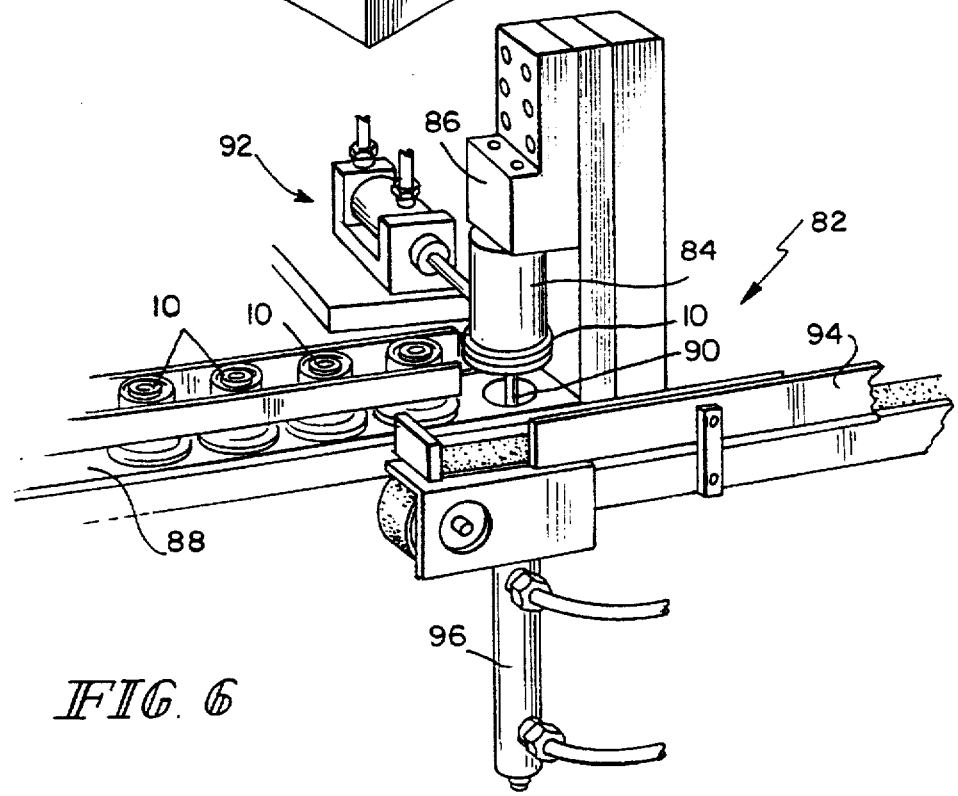
FIG. 6 is a perspective view of yet another embodiment of the present invention showing a single station conveyor assembly having a stationary testing neck, a movable conveyor platform supporting multiple caps thereon, and a lift for elevating individual caps into a fixed sealing engagement with the testing neck.

A single station conveyor assembly 82 suitable for use with the method of present invention is shown in FIG. 6. The assembly 82 includes an inverted testing neck 84 mounted on a testing block 86, a conveyor 88 that moves multiple caps 10, a hydraulic lift 90, a pneumatic cylinder 92, a pneumatic line 96 coupled to both the pneumatic cylinder 92 and the lift 90, and a receiving conveyor 94. Preferably, before final assembly, six caps 10 are moved from a line conveyor (not shown) onto the conveyor 88. The conveyor 88 moves the caps 10 toward the lift 90 where they are individually raised by the lift 90 into the stationary test neck 84. The cap 10 is staged for approximately six seconds before the gas is introduced into the testing neck 84 at a generally fixed pressure of 5 kPa. After testing for low-volume leaks, the caps 10 are pushed by the pneumatic cylinder 92 onto the receiving conveyor 94. The rejected caps are offloaded from the receiving conveyor 94 and the satisfactory good caps continue to final assembly.

The method in accordance with the present invention allows a user to minimize the effect of o-ring creep upon low-volume gas leak tests and thereby ensure more accurate test results. Although the invention has been described in detail with reference to certain preferred embodiments, variations and modifications exist within the scope and spirit of the invention as described and defined in the following claims.

The invention claimed is:

1. A method for testing for low-volume gas leaks through and around a fuel cap fitted onto and engageable with a test apparatus via a testing neck having a raised rim and wall defining an open volume receptacle of a cap-receiving passageway therein for connecting said fuel cap to said test apparatus, the fuel cap having a housing including a mouth and a seal positioned about the circumference of the mouth, the method comprising the steps of placing the housing of the fuel cap into the cap-receiving passageway of the testing neck such that said seal engages said raised rim, fixing the housing within the cap-receiving passageway so that the seal is compressed between the mouth and the raised rim of the testing neck to form an air-tight sealing engagement therebetween and the seal begins to move into the cap-receiving passageway of the testing neck, allowing a pre-determined amount of staging time to pass in order to allow the seal to complete its movement in the cap-receiving passageway of the testing neck, and testing for changes in gas pressure within the testing neck of said test apparatus after the pre-determined time where observation of a chance in gas pressure indicates the presence of a fuel cap gas leak.

2. The method of claim 1, wherein the pre-determined amount of staging time is at least about 2.5 seconds.

3. The method of claim 2, wherein the pre-determined amount of staging time is about 6 seconds.

4. The method of claim 1, wherein the testing step includes the steps of introducing gas having a predetermined pressure into the testing neck, permitting a second pre-determined testing period to pass, and testing the pressure within the testing neck.

5. The method of claim 4, wherein the second pre-determined testing period is at least about 2.5 seconds.

6. The method of claim 5, wherein the pre-determined amount of staging time is about 6 seconds.

7. The method of claim 4, wherein the second pre-determined testing period ranges from about 2.5 to about 8 seconds.

8. The method of claim 4, wherein the predetermined pressure is about 5 kPa.

9. The method of claim 1, wherein the housing of the cap includes a central axis and threads and the fixing step includes torquing the cap about the central axis in the cap-receiving passageway.

10. The method of claim 9, wherein the cap is torqued about the central axis at about 1.2 Newton-Meters.

11. The method of claim 1, wherein the fixing step includes clamping the housing within the cap-receiving passageway.

12. A method for testing for low-volume gas leaks through and around a fuel cap fitted onto and engageable with a test apparatus via a testing neck having a raised rim and wall defining an open volume receptacle of a cap-receiving passageway therein for connecting said fuel cap to said test apparatus, the fuel cap having a housing including a central axis, a mouth, and a seal positioned about the circumference of the mouth, the method comprising the steps of placing the housing of the fuel cap into the cap-receiving passageway of the testing neck such that said seal engages said raised rim, torquing the housing about the central axis into the cap-receiving passageway until the seal is compressed between the mouth and the raised rim of the testing neck to create an air-tight sealing engagement between the seal and said rim and the seal begins moving past the rim into the cap-receiving passageway, allowing at least 2.5 seconds of staging time to pass after completion of the torquing step, introducing gas having a pressure of about 5 kPa into the testing neck, and testing for changes in gas pressure within the testing neck of said test apparatus where observation of a change in gas pressure indicates the presence of a fuel cap gas leak.

13. The method of claim 12, wherein the testing neck includes threads positioned in the cap-receiving passageway and the cap includes threads formed to mate with the threads of the neck and the torquing step includes the step of turning the cap in such a manner to interlock the threads of the cap and the testing neck and to move the seal into engagement with the rim of the testing neck.

14. The method of claim 12, wherein the cap is turned about the central axis at a torque of about 1.2 Newton-Meters.

15. The method of claim 12, wherein the testing step includes the steps of introducing gas having a pre-determined pressure into the testing neck, permitting a second pre-determined testing period to pass, and determining whether at least 0.2 cubic centimeters/minute has passed by or through the fuel cap.

16. The method of claim 15, wherein the second pre-determined testing period is at least about 2.5 seconds.

17. The method of claim 12, wherein the cap is torqued about the central axis at a torque of about 1.2 Newton-Meters.

18. The method of claim 12, wherein the gas is air.

19. A method for testing for low-volume gas leaks through and around a fuel cap fitted onto and engageable with a test apparatus via a testing neck having a raised rim and wall defining an open volume receptacle of a cap-receiving passageway therein for connecting said fuel cap to said test apparatus, the fuel cap having a housing including a central axis, a mouth, and a seal positioned about the circumference of the mouth, the method comprising the steps of placing the housing of the fuel cap into the cap-receiving passageway of the testing neck such that said seal engages said raised rim, fixing the housing within the cap-receiving passageway so that the seal is compressed between the mouth and the raised rim of the testing neck to form a testing subassembly, moving the testing subassembly into engagement with said test apparatus for testing low-volume leaks through and around the fuel cap, and testing for changes in gas pressure within the testing subassembly where observation of a change in gas pressure indicates the presence of a fuel cap gas leak.

20. The method of claim 19, wherein the moving step lasts for at least 2.5 seconds.

21. The method of claim 20, wherein the moving step lasts about 6 seconds.

22. The method of claim 20, wherein the housing of the cap includes threads and the fixing step includes torquing the cap about the central axis in the cap-receiving passageway.

23. The method of claim 19, wherein the testing step includes the steps of introducing gas having a pre-determined pressure into the testing neck, permitting a second pre-determined testing period to pass, and determining whether at least 0.2 cubic centimeters/minute has passed by or through the fuel cap.

24. The method of claim 23, wherein the second pre-determined testing period is at least about 2.5 seconds.

25. The method of claim 19, wherein the moving step includes the steps of placing the testing subassembly on a conveyor system and transporting the testing subassembly on the conveyor system to the test apparatus for testing low-volume gas leaks through and around the fuel cap.

26. A method for testing for low-volume gas leaks through and around a fuel cap fitted onto and engagable with a test apparatus via a testing neck having a raised rim and wall defining an open volume receptacle of a cap-receiving passageway therein for connecting said fuel cap to said test apparatus, the fuel cap having a mouth and housing including a central axis, and a seal positioned around the circumference of the mouth, the method comprising the steps of placing the housing of the fuel cap into the cap-receiving passageway of the testing neck such that said mouth rests adjacent to a top surface of said raised rim, fixing the housing within the cap-receiving passageway so that an air-tight relationship is established between the mouth and the testing neck as the seal is compressed against the raised rim of the testing neck to form an air-tight sealing engagement therebetween and the seal begins to move into the cap-receiving passageway of the testing neck, allowing at least about 2.5 seconds of staging time to pass in order to allow the seal to complete its movement in the cap-receiving passageway of the testing neck, and testing for changes in gas pressure within the testing neck of said test apparatus after the staging time where an observation of any changes indicates the presence of a low-volume gas leak through and around said fuel cap.

27. The method of claim 26, wherein the staging time is at least about 6 seconds.

28. The method of claim 26, wherein the testing step includes the steps of introducing gas having a pre-determined determined pressure into the testing neck and testing the pressure within the testing neck.

29. The method of claim 28, wherein the second predetermined testing period is at least 2.5 seconds.

30. The method of claim 28, wherein the predetermined pressure is about 5 kPa.

31. The method of claim 26, wherein the housing of the cap includes a central axis and the fixing step includes torquing the housing about the central axis and into the cap-receiving passageway until the seal is compressed against the raised rim of the testing neck.

32. The method of claim 31, wherein the testing step includes the step of introducing gas having a pressure of about 5 kPa into the testing neck.

33. The method of claim 31, wherein the testing neck includes threads positioned in the cap-receiving passageway and a cap includes threads formed to mate with the threads of the neck and the torquing step includes the step of turning the cap in such a manner to interlock the threads of the cap and the testing neck and to move the seal into engagement with the raised rim of the testing neck.

34. A method for testing for low-volume gas leaks through and around a fuel cap fitted onto and engagable with a test apparatus via a testing neck having a raised rim and wall defining an open volume receptacle of a cap-receiving passageway therein for connecting said fuel cap to said test apparatus, the fuel cap having a mouth, a housing including a central axis, and a seal positioned around the circumference of the mouth, the method comprising the steps of placing the housing of the fuel cap into the cap-receiving passageway of the testing neck such that said seal is positioned to lie adjacent a top surface of said raised rim, fixing the housing within the cap-receiving passageway so as that an air-tight relationship is established between said mouth and said testing neck as the seal is compressed against the raised rim of the testing neck to form a testing subassembly, moving the testing subassembly into engagement with said test apparatus for testing low-volume leaks through and around the fuel cap, and testing for changes in gas pressure within the testing subassembly after at least 2.5 seconds of staging time has passed after completion of the fixing step where an observation of any in gas pressure with the testing neck indicates the presence of a low-volume gas leak through and around said fuel cap.

35. The method of claim 34, wherein the moving step includes the steps of placing the testing subassembly on a conveyor system and transporting the testing subassembly on the conveyor system to the test apparatus for testing low-volume gas leaks through and around the fuel cap.

* * * * *